United States Patent [19]

Ewald

[11] 4,422,293
[45] Dec. 27, 1983

[54] CLOSED-CENTER HYDRAULIC SERVO APPARATUS

[75] Inventor: Jerome T. Ewald, South Bend, Ind.

[73] Assignee: The Bendix Corporation, Southfield, Mich.

[21] Appl. No.: 273,148

[22] Filed: Jun. 12, 1981

[51] Int. Cl.³ .............................................. B60T 13/00
[52] U.S. Cl. ..................................... 60/547.1; 60/553; 60/560; 60/566; 91/434
[58] Field of Search ................. 60/548, 589, 550, 566, 60/547.1, 553, 560; 91/434, 370, 371, 372, 373

[56] References Cited

U.S. PATENT DOCUMENTS

| | | | |
|---|---|---|---|
| 3,074,383 | 1/1963 | Schultz | 60/548 |
| 3,526,089 | 9/1970 | Fulmer | 60/566 |
| 3,638,528 | 2/1972 | Lewis | 60/548 |
| 3,685,289 | 8/1972 | Kobashi | 91/434 |
| 4,034,825 | 7/1977 | Adams | 91/375 A |
| 4,241,583 | 12/1980 | Farr | 60/555 |
| 4,320,623 | 3/1982 | Farr | 60/547 R |

FOREIGN PATENT DOCUMENTS

| | | | |
|---|---|---|---|
| 1122851 | 1/1962 | Fed. Rep. of Germany | 60/589 |
| 1226444 | 10/1966 | Fed. Rep. of Germany | 60/548 |

*Primary Examiner*—Abraham Hershkovitz
*Attorney, Agent, or Firm*—Paul David Schoenle; Ken C. Decker

[57] ABSTRACT

A closed-center hydraulic servo apparatus (10) includes a closed-center valve device (112) which is coupled to an input member (60) to control the communication of fluid among a fluid pressure source (12,14), a fluid reservoir (36), and a fluid pressure responsive device (a vehicle brake) (16) in response to movement of the input member (60). The coupling (158, 160) between the closed-center valve device (112) and the input member (60) provides a movement ratio therebetween which is greater than unity. As a result, the inherent deadband (D) of the closed-center valve device (112) is reduced by the inverse of the movement ratio to a level (d) which is sensible to an operator at the input member (60).

6 Claims, 6 Drawing Figures

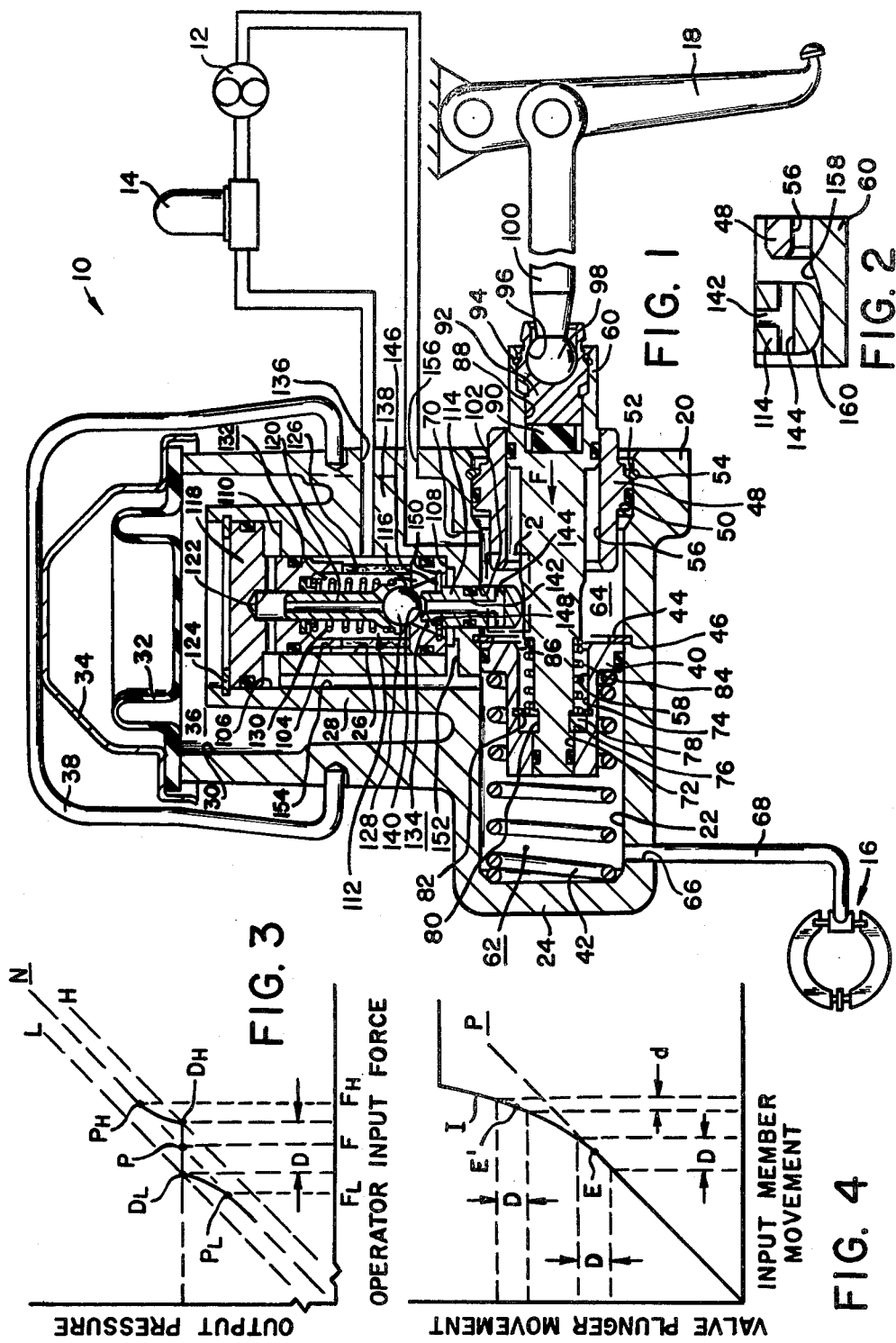

CLOSED-CENTER HYDRAULIC SERVO APPARATUS

This invention relates to a close-center hydraulic servo apparatus. More particularly, this invention relates to an apparatus which in the context of a hydraulic braking system for a vehicle is capable of performing the functions of both a master cylinder and of a hydraulic power booster for the vehicle brakes.

Accordingly, this invention provides a closed-center hydraulic servo apparatus comprising a housing defining an inlet receiving pressurized fluid from a source thereof, an outlet communicating fluid to a reservoir therefor, and a pressure chamber communicating presurized fluid to and from a fluid pressure responsive device; a flow path communicating said inlet, said outlet, and said pressure chamber; valve means disposed in said flow path for in a first position closing communication from said inlet to said outlet and pressure chamber and communicating the latter two, said valve means being shiftable to a second position sequentially closing communication between said outlet and pressure chamber and opening communication from said inlet to said pressure chamber, an input member movable in response to an operator input force, said input member defining a first reaction area communicating with said pressure chamber to produce a first reaction force opposing said operator input force.

A fluid pressure control valve is known in accordance with U.S. Pat. No. 3,526,089 (hereinafter '089), granted Sept. 1, 1970, to K. H. Fulmer, wherein a housing defines an inlet receiving pressurized fluid from a source thereof. An outlet communicates fluid to a reservoir therefor. A pressure chamber communicates presurized fluid to and from a vehicle brake via a transfer port. Within the housing, a flow path communicates the inlet, outlet, and pressure chamber. A closed-center type of valve device disposed in the flow path in a first position closes communication from the inlet to the outlet and pressure chamber and opens communication between the transfer port and outlet. The valve device is shiftable to a second position in response to an operator input force to sequentially close communication between the pressure chamber and outlet and to open communication of pressurized fluid from the inlet to the pressure chamber to actuate the vehicle brake.

The housing of the '089 invention defines a bore movably receiving a piston cooperating with the housing to bound the pressure chamber communicating with the transfer port. The piston carries the closed center valve device and also carries an input member which is connected to a brake pedal for receiving an operator input force. The valve device includes a valve ring secured in the piston. A valve stem is movably carried by the piston and carries a valve ball which is sealingly engageable with the valve ring. The valve ring, valve ball and valve stem cooperate with the piston to bound an inlet chamber receiving pressurized fluid from the inlet. The piston carries an annular rubber reaction disc. The input member carries a valve plunger movably extending through the reaction disc toward the valve ball. The reaction disc, valve plunger, valve ring, and valve ball cooperate with the piston to bound a cavity communicating with the transfer port via the pressure chamber. The valve plunger defines a duct communicating between the cavity and an outlet chamber which communicates with the outlet. The valve plunger also defines an annular valving surface which circumscribes the duct and which is sealingly engageable with the valve ball to close communication from the cavity to the outlet chamber. Movement of the inlet member in response to an operator input force to effect a brake application first engages the valving surface of the valve plunger with the valve ball and then unseats the valve ball from the valve ring to communicate pressurized fluid from the inlet chamber to the vehicle brake via the cavity and pressure chamber. The reaction disc defines a reaction area which is exposed to the cavity. The input member engages the reaction disc to receive a reaction force therefrom to oppose the operator input force.

During a brake application with a constant operator input force, the closed-center valve device is believed to seek an equilibrium position wherein the valving surface of the valve plunger is sealingly engaging the valve ball and the valve ball is sealingly engaging the valve disc. In the equilibrium position, the pressurized fluid in the cavity produces a reaction force exactly balancing the constant operator input force. As a result, for every constant operator input force there corresponds an output pressure which is communicated to the vehicle brakes.

So long as pressurized fluid is supplied by the source to the inlet of the '089 invention, the piston is held immobile in the bore by fluid pressure. In the event that pressurized fluid is not supplied to the inlet, the input member is engageable with the piston to move the latter to contract the pressure chamber. A check valve associated with the inlet prevents the back flow of fluid through the inlet so that contraction of the pressure chamber pressurizes fluid therein and forces pressurized fluid to the brake via the transfer port.

A power brake apparatus which is similar to the '089 invention is known in accordance with the U.S. Pat. No. 3,183,670 (hereinafter '670), granted May 18, 1965, to H. B. Schultz, et al., wherein the housing bore movably receives a first piston which is comparable to the piston of the '089 invention. The housing bore also receives a second piston movably dividing the pressure chamber into a pair of compartments which individually communicate with independent brakes via a pair of transfer ports. One of the pair of compartments communicates with the inlet via the valve device to receive pressurized fluid therefrom. The other of the pair of compartments communicates with a fluid reservoir via a compensation port having a tilt valve disposed therein. Pressurized fluid communicated to the one compartment moves the second piston to close the tilt valve to trap and pressurize fluid in the other compartment.

With a fluid pressure control valve of the type illustrated in the '089 patent, the closed-center valve device, because it is carried within the piston, contributes to the overall length of the control valve. In light of the current trend toward smaller, fuel-efficient vehicles having limited under-hood space, the overall length of the '089 invention is a deficiency. Additionally, because the valve device opens communication between the pressure chamber and inlet in response to an operator input, the check valve associated with the inlet is essential in order to allow fluid to be trapped and pressurized in the pressure chamber when the piston is moved by an operator input, e.g., without power assistance after a failure of the fluid pressure source. If the check valve should fail to close for any reason, an actuation of the vehicle brakes without power assistance is impossible. Therefore, the check valve presents a hazard of total brake system failure. Further, during normal operation of the brake system with power assistance, the vehicle operator will not receive any warning that the check valve has failed or is about to fail because the check valve is not essential to normal operation of the fluid pressure control valve.

Similarly, with a power brake apparatus of the type illustrated in the Schultz, et al., '670 patent, the inclusion of the closed-center valve device within the first piston contributes to the overall length of the apparatus to the same extent that this feature did in the '089 control valve. A check valve is also associated with the inlet of the '670 invention and presents the same risk of braking system failure as does the check valve of the '089 invention with the exception that the '670 invention retains the capability for actuation of the brake system associated with the other compartment without power assistance even if the check valve should fail.

A further consideration with the '670 invention is that if the one compartment fails to hold pressurized fluid during a brake application, e.g. because of a breached brake line, power assistance to the brakes associated with the other compartment is lost even though the fluid pressure source may be functioning properly.

A recognized deficiency of the '089 and '670 devices and of all known closed-center hydraulic servo apparatus is a certain vagueness, lag, or nonlinearity of the braking effort produced by the vehicle braking system during a brake application in response to modulation of the operator input force to either increase or decrease the braking effort. More specifically, the closed-center type of valve device inherently produces a graph of output pressure versus operator input force which illustrates a hysteresis for the valve. The valve hysteresis results, inter alia, from the sequential closing of communication between the pressure chamber and outlet and opening of communication from the inlet to the pressure chamber. As a result, the graph of output pressure versus operator input force will show that associated with each output pressure there is a finite range of possible operator input forces. As the applied operator input force traverses the finite range of possible forces during brake modulation, it is possible that no change of output pressure will result. In a servo system such a lack of output response to a changed input is termed a "dead band". In a braking system, a dead band is perceived by a vehicle operator as nonlinear or unpredictable braking response of his vehicle to his modulation of effort applied to the brake pedal. Of course, such a dead band is undesirable because a vehicle operator likes to experience an immediate response of the vehicle which is proportional to the control input which the operator has applied.

The invention as claimed is intended to avoid or ameliorate one or more of the deficiencies of prior closed-center hydraulic servo apparatus by providing an apparatus characterized in that said apparatus includes means for drivingly coupling said input member to said valve means to shift the latter between said first and second positions in response to movement of the former, said coupling means shifting said valve means at a ratio with respect to movement of said input member which is greater than unity.

The advantages offered by the invention are mainly that the valve device does not contribute as much to the overall length of the apparatus as it does in the '089 and '670 inventions. A check valve associated with the inlet is not needed. The function of the check valve is performed by a movable partition member which closes communication between the pressure chamber and cavity when a brake application is effected without power assistance. Because the partition member sealingly cooperates with the housing to separate the pressure chamber from an adjacent outlet chamber communicating with the outlet, a diminution of the sealing integrity of the partition member is sensible to the vehicle operator as a diminished effectiveness of normal power assisted braking. Further, because the valve device is drivingly coupled to the input member by a coupling means providing a movement ratio therebetween which is greater than unity, the inherent dead band of the closed-center valve device is traversed more quickly in response to movement of the input member of the invention than is the case with prior art apparatus. In other words, the inherent dead band of the closed-center valve device is reduced in comparison to prior art apparatus by the inverse of the movement ratio which is provided by the coupling means. In many cases the reduced dead band which is sensible at the input member will be below the perception threshold of the vehicle operator. As a result, the vehicle operator will perceive that the braking system of his vehicle provides a linear and predictable response to his control inputs.

Three ways of carrying out the invention are described in detail below with reference to drawing figures which illustrate only the three preferred embodiments of the invention, in which:

FIG. 1 is a longitudinal elevation view, partly in cross section, of a hydraulic servo apparatus according to the invention in the context of a vehicle braking system which is illustrated schematically;

FIG. 2 is an enlarged view of an encircled portion of FIG. 1;

FIG. 3 is a graph of fluid output pressure versus operator input force for a closed-center valve device;

FIG. 4 is a graph of valve plunger movement versus input member movement according to the prior art and to the invention;

Figure 5:
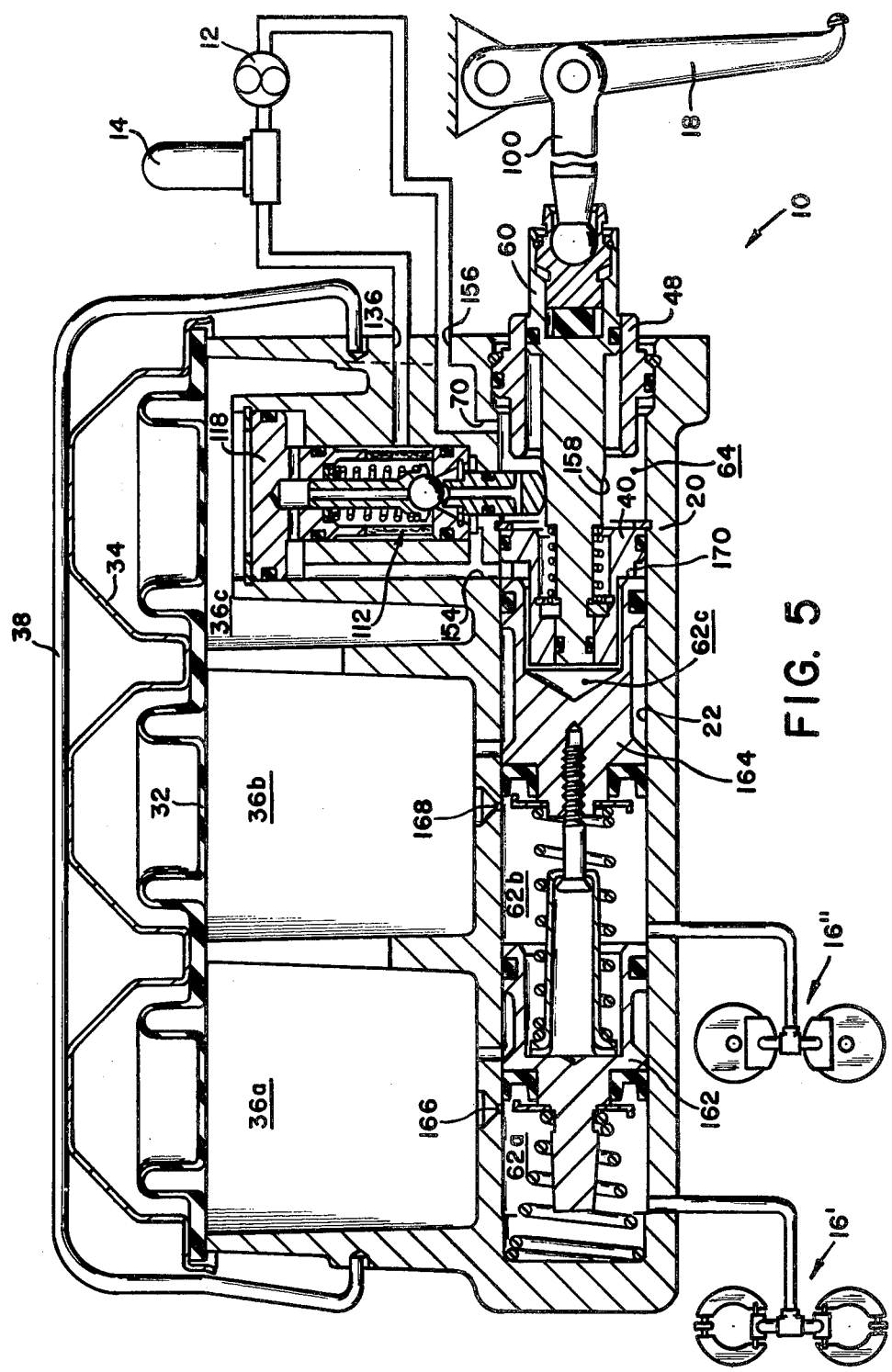
FIG. 5 is a longitudinal elevation view, partly in cross section, of an alternative embodiment of the invention.

With reference to FIG. 1, a closed-center hydraulic servo apparatus 10 is illustrated in the context of a vehicle braking system which includes a power-driven hydraulic pump 12, a fluid pressure accumulator 14, a vehicle brake 16, and a brake pedal 18 which is operable by a vehicle operator to effect a brake application. The apparatus 10 includes a housing 20 defining a first bore 22 having an end wall 24. The housing 20 also defines a stepped second bore 26 within a boss 28. The second bore 26 intersects the first bore 22 and is substantially perpendicular thereto. The housing 20 defines an open recess 30 surrounding the boss 28. A flexible diaphragm 32 and a cap 34 close the recess 30 and cooperate with the housing 20 to define a fluid reservoir 36. The cap 34 is removably secured to the housing 20 by a spring wire clip 38 and defines an aperture (not shown) venting the upper side of the diaphragm 32 to atmospheric pressure. As a result, fluid held in the reservoir 36 is maintained at substantially ambient pressure.

An annular partition member 40 is movably and sealingly received in the bore 20. A coil compression spring 42 extends between the end wall 24 and the partition member 40 to yieldably bias the latter into engagement with a retaining ring 44 carried in a groove 46 defined by the housing 20. An annular bearing member 48 is sealingly received within the bore 22 between a step 50 on the latter and a retaining ring 52 which is carried in a groove 54 defined by the housing 20. The bearing member 48 defines a cylindrical aperture 56 which is coaxially aligned with a stepped socket 58 defined by the partition member 40. An input member 60 is sealingly and movably received in the aperture 56 and in socket 58. The partition member 40, bearing member 55, and input member 60 cooperate with the housing 20 to define a variable-volume pressure chamber 62 and an outlet chamber 64. The pressure chamber 62 communicates with the brake 16 via a transfer port 66 and a brake line 68. The outlet chamber 64 communicates with the reservoir 36 via an outlet port 70.

The socket 58 of the partition member 40 includes a small diameter portion 72 opening to the chamber 62 and a large diameter portion 74. The bore portions 72 and 74 cooperate to define a step 76 therebetween. A U-shaped washer 78 is received in an annular groove 80 which is defined by the input member 60. The washer 78 is held in engagement with the step 76 by a retaining ring 82 which is carried by the partition member 40. The axial dimension of the annular groove 80 is greater than that of the washer 78. Consequently, the partition member and input member are coupled for axial movement in unison while having a limited relative freedom of movement or lost motion therebetween. A coil compression spring 84 extends between the washer 78 and a graduation 86 on the input member 60 to bias the input member and partition member to an axially extended nonbraking position.

The input member 60 defines a cavity 88 which receives an elastomeric cushion member 90 and an input shoe 92, both of which are retained in the cavity 88 by a retaining ring 94. A recess 96 defined by the input shoe 92 receives the ball-end portion 98 of an input rod 100 which is pivotally coupled at its opposite end to the brake pedal 18.

The stepped second bore 26 includes a small diameter part 102 opening to the bore 22, an intermediate diameter port 104, and a large diameter part 106 which opens to the reservoir 36. The bore parts 102-104 and 104-106 cooperate to define steps 108 and 110, respectively, therebetween.

A closed-center valve device 112 is received in the stepped bore 26. The valve device 112 includes a valve plunger 114 which is movably and sealingly received in the small diameter bore part 102, an annular valve ring 116 sealingly received in the intermediate diameter bore part 104 and seating on the step 108, a stepped bushing member 118 sealingly received in the intermediate diameter bore part 104 and in the large diameter bore part 106, and a valve stem 120 which is sealingly and movably received in a pocket 122 defined by the bushing member 118. The bushing member 118 is retained in the bore 26 by a retaining ring 124. A fluid-permeable, annular filter 126 extends between the bushing member 118 and the annular valve ring 116 to hold the latter against the step 108. The valve stem 120 carries a spherical valve ball 128 which sealingly engages the valve ring 116 under the urging of a compression spring 130 to close communication between an inlet chamber 132 and a cavity 134. The sealing diameter defined by the valve ball 128 with the valve ring 116 is substantially the same as the diameter of the valve stem 120 which is sealingly received in the pocket 122. As a result, the valve stem 120 is pressure balanced within the inlet chamber 132. The housing 20 defines an inlet port 136 communicating pressurized fluid from the pump 12 and accumulator 14 into the inlet chamber 132 via a bridge portion 138 which extends through the reservoir 36 to the boss 28.

The valve plunger 114 extends into the cavity 134 and defines an annular valving surface 140 which is engageable with the valve ball 128 to lift the latter away from the valve ring 116. The valve plunger defines an axial duct 142 extending from within the valving surface 140 to a transverse passage 144 opening to the outlet chamber 64. An annular wire-ring resilient member 146 is carried in the cavity 134 between a shoulder 148 on the valve plunger 114 and an annular groove 150 defined by the valve ring 116. The resilient member 146 yieldably biases the valve plunger 114 downwardly to a nonbraking position wherein the valving surface 140 is spaced from the valve ball 128. A passage 152 communicates the cavity 134 with a passage 154 which opens to the pressure chamber 62 immediately adjacent the partition member 40. The passage 154 also communicates with the pocket 122 above the valve plunger 120. Consequently, in the nonbraking position of the servo apparatus 10 (which is illustrated by FIG. 1), the valve device 112 closes communication from the inlet 136 to the transfer port 66 and opens communication between the transfer port and the outlet 70 so that the pressure chamber 62 and the fluid motor of the brake 16 are communicated to the reservoir 36 and maintained at substantially ambient pressure. The reservoir 36 communicates with the inlet of the pump 12 via a suction port 156.

Turning to FIG. 2, it will be seen that the input member 60 defines a tapering portion or cam surface 158. The valve plunger 114 defines at its lower end a cam follower surface 160 which slidably engages the cam surface 158. In the nonbraking position of the input member the cam surface and follower surface cooperate to support the valve plunger in its nonbraking position.

When a vehicle operator pivots the brake pedal 18 clockwise to effect a brake application, an input force F is communicated to the input member 60 by the input rod 100. The input force F moves the input member 60 leftwardly contracting the spring 84 and moving the cam surface 158 leftwardly under the cam follower surface 160. Because the spring 42 is stronger than the spring 84, the partition member is maintained in engagement with the retaining ring 46. Leftward movement of the input member 60 causes the valve plunger 114 to be moved upwardly into engagement at its valving surface 140 with the valve ball 128 to close communication between the chamber 62 and the outlet 70. Further leftward movement of the input member 60 moves the valve stem upwardly to unseat the valve ball 128 to communicate pressurized fluid from the inlet chamber 132 to the cavity 134 and hence to the chamber 62 and brake 16 to effect a brake application. Pressurized fluid in the chamber 62 acts upon the left end of the input member 60 to create a first reaction force opposing the operator input force. Similarly, pressurized fluid in the cavity 134 acts upon the valve stem 114 to create a downwardly directed second reaction force. The downwardly directed second reaction force is redirected by the follower surface 160 and cam surface 158 into an axially directed reaction force which also opposes the operator input force.

Having observed the details of the valve device 112, attention may now be given to the fact that during a brake application with a constant operator input force, the closed center valve device 112 seeks an equilibrium condition wherein the valving surface 140 of the valve plunger 114 sealingly engages the valve ball 128 which in turn sealingly engages the valve ring 116. In the equilibrium condition, the pressurized fluid maintained in the chamber 62 and cavity 134 creates first and second reaction forces which in concert balance the constant operator input force. Thus, for every constant operator input force there corresponds an output pressure communicating to the vehicle brakes. The dashed line N of FIG. 3 illustrates graphically the above relationship. However, if during a brake application, the operator input force is increased or decreased from a first level to a second level, the valve plunger and valve ball must move either upwardly or downwardly through finite distances from their equilibrium positions to either increase or decrease the fluid pressure in the cavity 134 and chamber 62 before returning to their equilibrium positions. These finite movements of the valve plunger and valve ball in response to changes of the operator input force are primarily responsible for the dead band of the closed-center type of valve devices. FIG. 3 illustrates graphically the effect of the dead band when the operator input force is changed from a first level F to either a higher level Fh or to a lower level Fl. The output pressure initially remains unchanged until the change in the input force exceeds the bounds of the dead band, which bounds are indicated by dashed lines H and L and corresponding points Dh and Dl. The output pressure then increases or decreases, moving along line Dh–Ph or Dl–Pl to the respective points Ph or Pl. Therefore, a dead band of width D is experienced at the valve plunger of the closed-center valve device 112. The dead band D is also typical of the valve devices of the '089 and '670 patents.

FIG. 4 illustrates by dashed line P the movement of the valve plungers of the '089 and '670 patents in response to movement of their input members. Because the valve plungers of the prior art devices are carried by and move in unison with their input members, the line P has a slope of 1, indicating a 1 to 1 ratio. Projecting the dead band D at the valve plunger of the closed-center valve devices onto the line P of FIG. 4 shows that a vehicle operator may sense an equal dead band D at the input member. A point E on FIG. 4 indicates arbitrarily the equilibrium position of the valve plunger.

The cam surface 158 and follower surface 160 of the present invention cooperate to move the valve plunger 114 in response to movement of the input member 60 as is illustrated by the solid line i of FIG. 4. It will be noted that the line i is coincident with the line P between the origin of the graph (the nonbraking position of the valve plunger) and the point E. Beyond the point E the line i is curvilinear or exponential and concave upwardly so that the line i has a slope greater than 1 over a portion of its length.

When the input member 60 is initially moved leftwardly by an operator input force, the valve plunger 114 is moved upwardly from its nonbraking position into engagement with the valve ball 128 approximately at the equilibrium position E. Thereafter, further upward movement of the valve plunger 114 unseats the valve ball 128 to communicate pressurized fluid to the cavity 134 and pressure chamber 62. Pressurized fluid in the cavity 134 produces the downwardly directed second reaction force on the valve plunger 114, as discussed supra. The valve plunger 114 transfers the downwardly directed second reaction force to the input member 60. Consequently, the input member 60 is deflected downwardly beneath the valve plunger 114 by the second reaction force. Additionally, radial clearances which exist among the input member 60, bearing member 48, partition member 40, and the housing 20 are taken up because of the second reaction force so that the input member 60 moves downwardly relative to the axis of the bore 22, viewing FIG. 1. The result of the deflection and downward movement of the input member 60 is that the input member must be moved further leftwardly in order to raise the valve plunger 114 to its equilibrium position.

FIG. 4 illustrates that the effect of further leftward movement of the input member 60 is to cause the cam follower surface 160 to engage the cam surface 158 on the curvilinear portion thereof. In effect a new equilibrium position E' is established for the valve plunger 114. The position of the new equilibrium position E' is a function of the downward movement and deflection of the input member 60 in response to the downwardly directed second reaction force.

Projecting the dead band D of the closed center valve device onto the line i adjacent the new equilibrium position E' shows that a reduced dead band d is sensible to a vehicle operator at the input member 60. The reduced dead band d is smaller than D according to the slope of the line i adjacent the new equilibrium position E'. Thus, it will be understood that the invention provides a variable dead band which initially is substantially equal to that of the prior art devices and which decreases according to the magnitude of the operator input force because the second reaction force varies with operator input force. In many cases the diminished dead band d will be below the perception threshold of the vehicle operator. Further, the diminished dead band d results in an increased responsiveness of the servo apparatus 10 to modulations of the operator input force.

In the event that the pump 12 or accumulator 14 fails to supply pressurized fluid to the inlet 136, an operator input force is transferable from the input member 60 to the partition member 40 via the U-shaped washer 78. The partition member 40 is movable leftwardly across the passage 154 to trap and pressurize fluid in the pressure chamber 62 to effect a brake application without power assistance. Because the partition member 40 sealingly separates the pressure chamber 62 from the outlet chamber 64, any loss of sealing integrity therebetween which would interfere with a brake application without power assistance will also manifest itself as a diminished braking effectiveness during braking with power assistance. The diminished braking effectiveness will be sensible to the vehicle operator during normal operation of the vehicle and will serve as a warning to the operator.

FIG. 5 illustrates an alternative embodiment of the invention wherein features which are analogous in structure or function to those illustrated in FIG. 1 are referenced by the same numeral previously used. In FIG. 5, the housing 20 and bore 22 therein are elongated in comparison to the first embodiment of the invention. The reservoir 36 is enlarged and subdivided into three subparts referenced as 36a, 36b, and 36c. The pressure chamber 62 is divided into three sub-chambers 62a, 62b, and 62c by a pair of movable pressure-responsive pistons 162 and 164. The pressure chamber 62a communicates with the reservoir subpart 36a and with a brake system 16'. The pressre chamber 36b communicates with the reservoir subpart 36b and with a brake system 16'' which is independent of the brake system 16'. The chamber 62c communicates with the passage 154 to receive pressurized fluid. The pistons 162 and 164 are movable leftwardly across compensation ports 166 and 168, respectively, to trap and pressurize fluid in the pressure chambers 62a and 62b in response to pressurized fluid in the chamber 62c. In the event that one of the brake lines to the brake systems 16' or 16'' is breached, power actuation of the other brake system is still possible because the pistons 162 and 164 prevent the loss of pressurized fluid from the chamber 62c via the breached brake line. Further, the piston 164 and the partition member 40 define cooperating abutments at 70 so that leftward movement of the partition member 40 can drive the piston 164 leftwardly to effect a nonassisted brake application in the conventional way.

Figure 6:
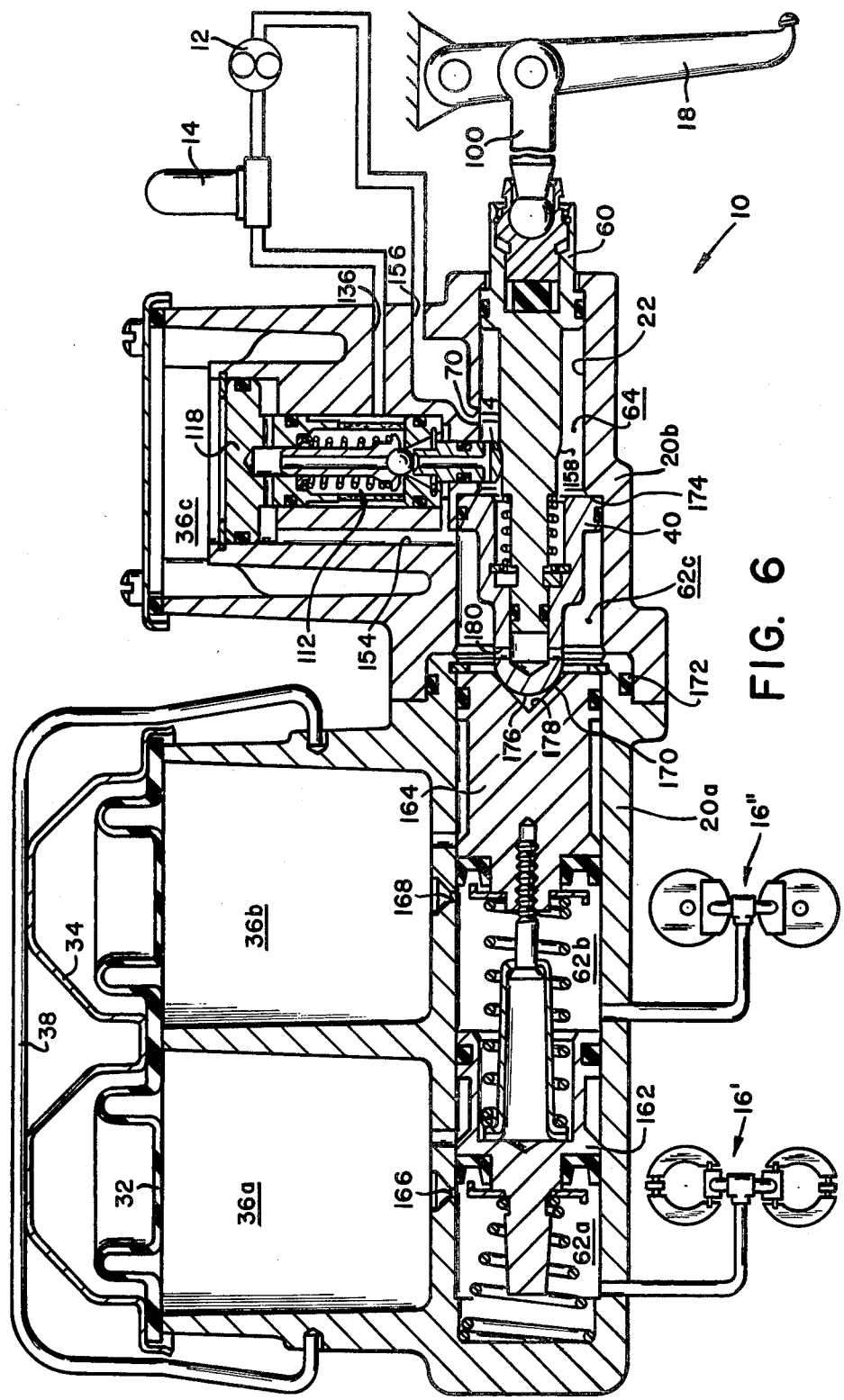
FIG. 6 is a view similar to FIG. 5 and illustrating another alternative embodiment of the invention.

FIG. 6 illustrates another alternative embodiment in which previously used reference numerals reference analogous structures and which is similar to the embodiment illustrated by FIG. 5, with the exception that the housing 20 is composed of two parts 20a and 20b. The parts 20a and 20b are secured one to the other by bolts (not shown). As such, the housing part 20a and the structure therein comprises a conventional master cylinder. The housing part 20b and the structure therein comprises a hydraulic brake booster adapted to coact with the conventional master cylinder. The housing parts 20a and 20b sealingly cooperate at their interface via an O-ring seal 172 to bound a chamber 62c. The housing part 20b defines a stepped bore 22 therein movably receiving the partition member 40 and the input member 60. Because the bore 22 is stepped, the input member engages a step 174 on the bore 22 to define the nonbraking position thereof. Moreover, the retaining rings 44 and 52 and the bearing member 48 employed in the embodiments of the FIGS. 1 and 5 are not necessary in the embodiment of FIG. 6. The partition member 40 defines a rounded nose 176 which cooperates with a recess 178 defined by the piston 164 to define cooperating abutments at 170. The nose 176 also defines an aperture 180 communicating the pressure chamber 62c with the left end of the input member 60. Those skilled in the art will recognize that the embodiment of the invention illustrated by FIG. 6 offers the utility of converting existing master cylinders for use in a closed-center braking system. For example, master cylinders which are presently used with open-center hydraulic boosters or with vacuum boosters may be combined with a hydraulic booster like that illustrated by FIG. 6. Consequently, the recognized energy saving advantages of a closed-center braking system may be made available to the public at a lower cost than might otherwise be possible.

I claim:

1. A closed-center hydraulic servo apparatus comprising a housing defining a pair of intersecting bores therein, a partition member movably received in one of said pair of bores and sealingly cooperating with said housing to substantially bound a variable-volume pressure chamber, an inlet communicating pressurized fluid from a source thereof into the other of said pair of bores, an outlet communicating a reservoir with said one bore, a passage opening on said one bore to communicate said pressure chamber and said other bore, valve means received in said other bore for in a first position closing fluid communication from said inlet to said pressure chamber, said valve means shifting to a second position to communicate pressurized fluid from said inlet to said pressure chamber, said valve means including a valve plunger extending from said other bore into said one bore, axial movement of said valve plunger shifting said valve means between said first and second positions, an input member reciprocably received in said one bore, said input member movably cooperating with said valve plunger to axially move the latter in said other bore in response to reciprocation of the former in said one bore, said partition member defining a socket leading to said pressure chamber, said socket movably and sealingly receiving a portion of said input member and said portion of said input member defining a first reaction area for opposing an operator input force applied to said input member, said valve plunger being exposed to the fluid pressure within said pressure chamber via said other bore and said valve plunger being exposed to said reservoir via said one bore to define a second reaction area for opposing said operator input force.

2. A closed-center hydraulic brake booster comprising:

a housing defining a first bore therein;

a partition member reciprocably and sealingly received in said first bore, said housing carrying an abutment member engageable by said partition member to define a nonbraking position for the latter, said partition member defining a socket communicating axially therethrough;

an input member sealingly and reciprocably received in said first bore and in said socket, said partition member and said input member cooperating with said housing to bound an outlet chamber therewithin, said outlet chamber communicating with a fluid reservoir via an outlet, said partition member coupling for movement in unison with said input member via a lost motion connection and cooperating with said housing to bound a pressure chamber;

first resilient means for yieldably biasing said input member to an axially extended position relative said partition member, said lost motion connection defining a nonbraking position for said input member;

said housing defining a second bore mutually perpendicular to and intersecting said first bore, said second bore including a small diameter portion opening to said outlet chamber and cooperating with the remainder of said second bore to define a step thereon;

a valve plunger reciprocably and sealingly received in said small diameter bore portion and extending into said first bore;

an annular valve disc sealingly received in said second bore and engaging said step;

a bushing member sealingly received in said second bore and defining a pocket opening toward said valve disc;

a valve stem reciprocably received in said second bore and sealingly received in said pocket, said valve stem carrying a valve ball sealingly engageable with said valve disc;

second resilient means for yieldably biasing said valve stem toward said valve disc so that said valve ball engages said valve disc to define a first position for said valve stem; said valve disc, valve ball, bushing member and valve stem cooperating with said housing to bound an inlet chamber therewithin, said valve disc and valve plunger cooperating with said housing to bound a cavity therewithin;

an inlet communicating pressurized fluid from a source thereof into said inlet chamber, and a passage communicating said cavity with said pocket, said passage opening on said first bore immediately adjacent said partition member to communicate said cavity with said pressure chamber;

said valve plunger extending into said cavity and defining an annular varying surface sealingly engageable with said valve ball, a duct extending through said valve plunger from within said annular valving surface to said outlet chamber;

third resilient means for yieldably biasing said valve plunger toward said input member, said valve plunger and said input member defining coacting means for reciprocating the former in response to reciprocation of the latter;

said coacting means opposing said third resilient means to support said valve plunger in a first position spacing said valving surface from said valve ball when said input member is in its nonbraking position to communicate said cavity to said outlet chamber via said duct;

said input member moving within said housing to a first braking position in response to an operator input force to sequentially shift said valve plunger to a second position sealingly engaging said valving surface with said valve ball and to a third position moving said valve ball from its first position to a second position spaced from said valve disc to communicate pressurized fluid to said cavity, said passage communicating pressurized fluid to said pressure chamber;

said input member further moving to a third braking position coupling for movement with said partition member via said lost motion coupling, said input member moving said partition member across said passage opening to interrupt fluid communication between said pressure chamber and said cavity.

3. The invention of claim 2 wherein said input member defines a first reaction area communicating with said pressure chamber via said socket to oppose said operator input force, said valve plunger defining a second reaction area also communicating with said pressure chamber to oppose said operator input force via said coacting means.

4. The invention of claim 2 wherein said first bore is closed at one end by an end wall defined by said housing, said end wall bounding said pressure chamber, and a transfer port communicating pressurized fluid from said pressure chamber to and from a brake.

5. The invention of claim 4 wherein said pressure chamber is divided into a pair of compartments by a piston member movably and sealingly received in said first bore, one of said pair of compartments communicating with said transfer port, the other of said pair of compartments communicating with said passage.

6. The invention of claim 2 wherein said first bore communicates through said housing, said housing sealingly cooperating with a master cylinder to bound said pressure chamber, said partition member defining an abutment surface engaging a piston of said master cylinder to effect a brake application in response to movement of said partition member.

* * * * *